May 10, 1932.　　　A. I. MARCUM　　　1,857,249
MULTIWHEEL ROAD VEHICLE
Filed Oct. 3, 1928　　　3 Sheets-Sheet 1
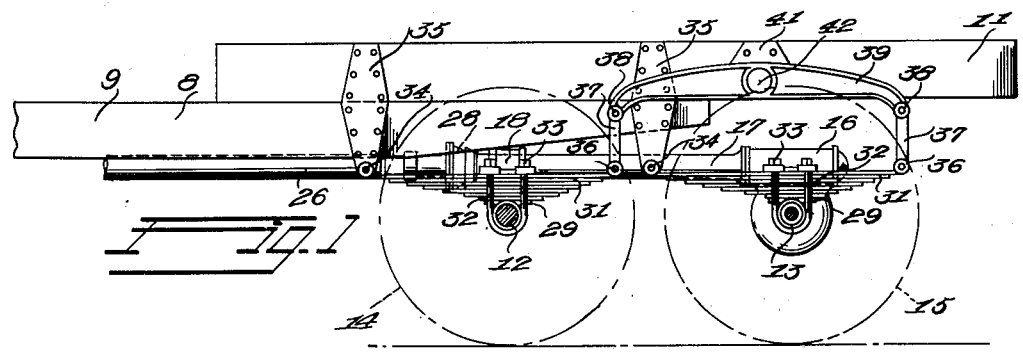
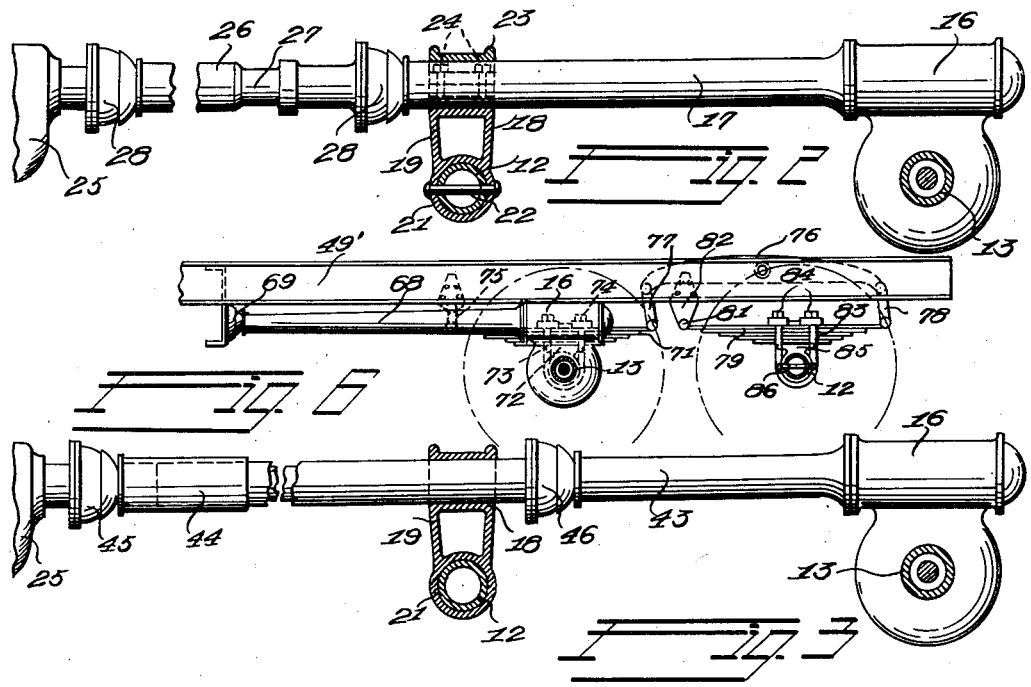
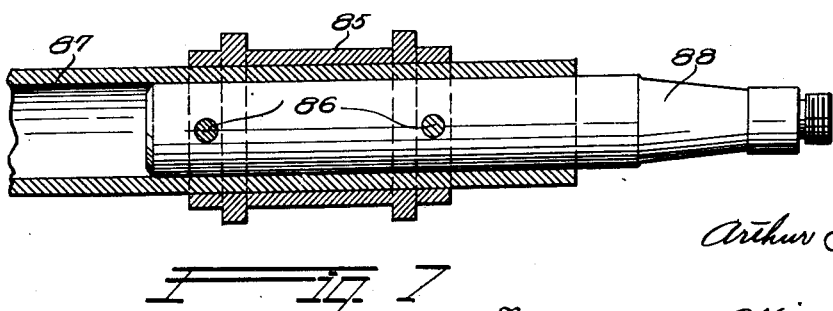
Inventor
Arthur J. Marcum
By
William A. Strauch
Attorney

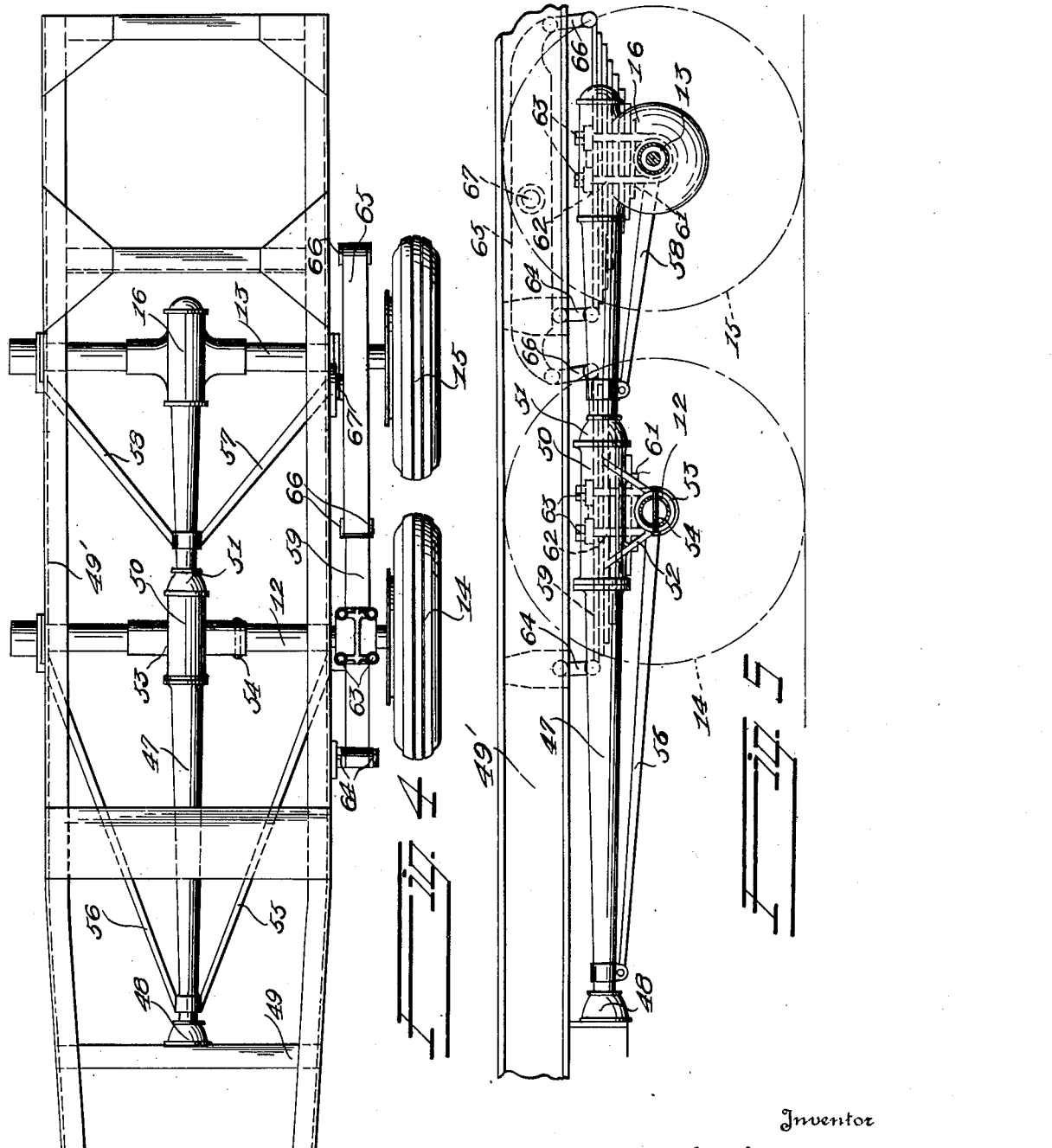

May 10, 1932.  A. I. MARCUM  1,857,249
MULTIWHEEL ROAD VEHICLE
Filed Oct. 3, 1928  3 Sheets-Sheet 3
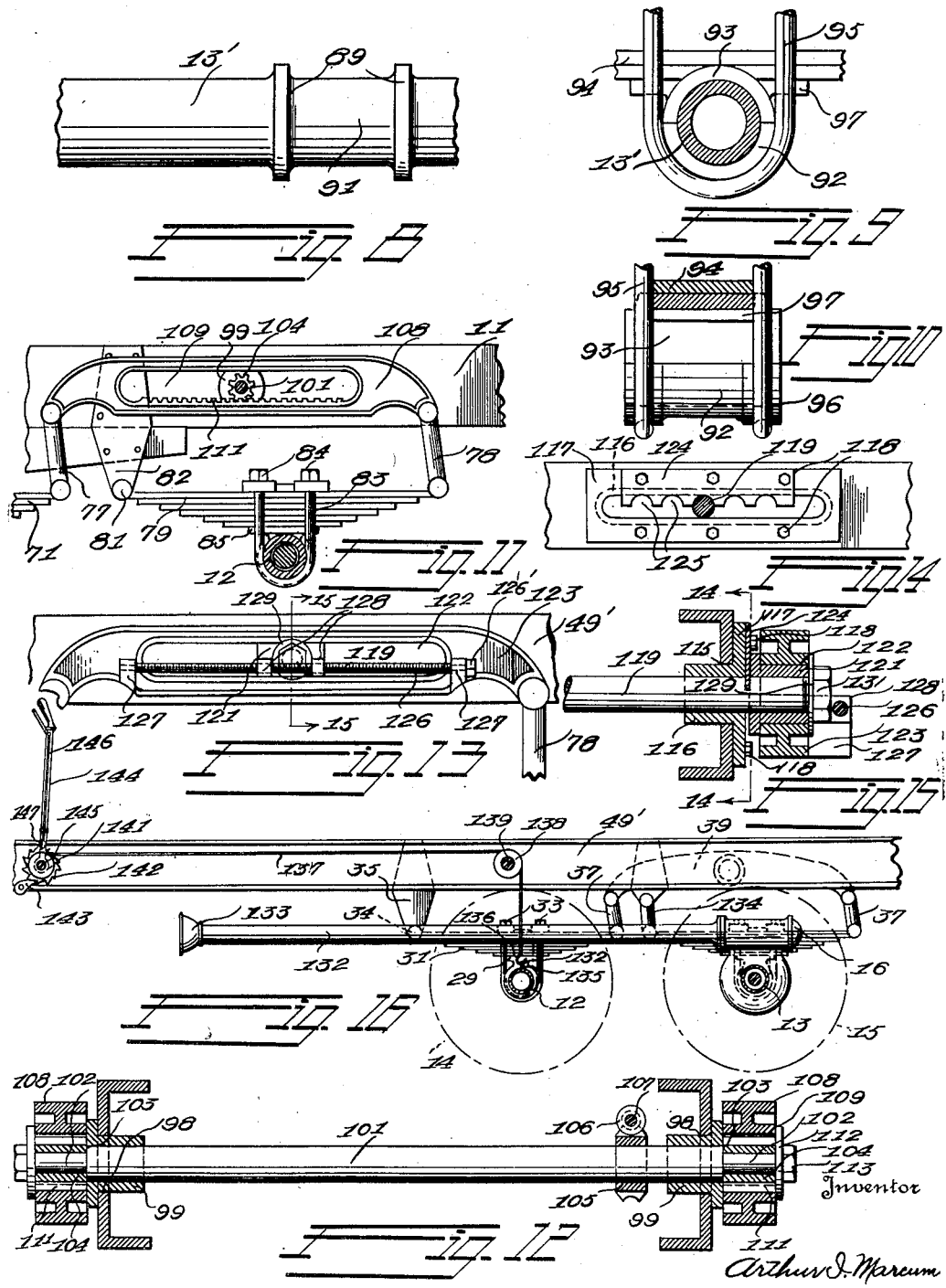

Patented May 10, 1932

1,857,249

UNITED STATES PATENT OFFICE

ARTHUR I. MARCUM, OF OAKLAND, CALIFORNIA

MULTIWHEEL ROAD VEHICLE

Application filed October 3, 1928. Serial No. 309,988.

The present invention relates to multi-wheel road vehicles.

More particularly the invention relates to multi-wheel road vehicles comprising a driving axle and a dead axle, connected with the vehicle frame by compensating spring suspensions for permitting independent oscillation of said axles and transmitting shocks to the springs individual to either axle not absorbed thereby to the springs individual to the other axle.

A primary object of the present invention is the provision of a multi-wheel road vehicle comprising a frame, a driven axle and a dead axle disposed adjacent one end of said frame, torque resisting means secured to said driven axle and connected with said dead axle, a propeller shaft for said driving axle extending through said torque resisting means, and compensating spring suspensions connecting said axles with said frame.

A further object of the invention is the provision of a multi-wheel road vehicle comprising a frame, a driving axle and a dead axle disposed adjacent one end of said frame and yieldably connected therewith, torque resisting means secured to said driving axle and slidably connected with said dead axle, and a propeller shaft for driving said driving axle extending through said torque resisting means.

A still further object of the invention is the provision of a multi-wheel road vehicle comprising a frame, a driving axle and a dead axle disposed adjacent one end of said frame and yieldably connected therewith by compensating spring suspensions, a torque tube secured to said driving axle and said dead axle and flexibly connected with said frame, stay rods interconnecting the opposite ends of said axles with said torque tube, and a propeller shaft for said driving axle extending through and housed by said torque tube.

A still further object of the invention is the provision of a multi-wheel road vehicle comprising a frame, a driving axle and a dead axle disposed adjacent one end of said frame, springs supported by said axles and connected with said frame, said connections to said frame embodying adjustably mounted means for equalizing the load carried by said vehicle on said axles or selectively shifting a portion of the load carried by one axle to the other axle.

A still further object of the invention is the provision of a multi-wheel road vehicle comprising a frame, a driving axle disposed adjacent one end of said frame, torque resisting means rigidly secured at one end to said driving axle and flexibly connected at the other end to said frame, a propeller shaft extending through said torque resisting means for driving said driving axle, a dead axle disposed adjacent said driving axle, and compensating spring suspensions connecting said axles with said frame.

A still further object of the invention is the provision of a multi-wheel road vehicle comprising a frame, a driving axle and a dead axle disposed adjacent one end of said frame, compensating spring suspensions connecting said axles with said frame, and means for shifting the load carried by one axle to the other axle.

Further objects of the invention will appear as the description thereof proceeds with reference to the accompanying drawings in which—

Figure 1 is a side elevation of the rear end of a vehicle constructed in accordance with one of the embodiments of my invention, the body being omitted and the wheels diagrammatically illustrated in outline.

Figure 2 is a side elevational view of the driving means and torque connections illustrated in Figure 1 with the dead axle and support therefor and drive axle housing shown in section.

Figure 3 is a view similar to Figure 2 depicting a modified arrangement.

Figure 4 is a top plan view of the rear portion of a vehicle frame disclosing the application of a further modification of my invention.

Figure 5 is a longitudinal sectional view of the construction shown in Figure 4.

Figure 6 is a longitudinal sectional view of a still further modification of my invention.

Figure 7 is a longitudinal sectional view of one end of the dead axle illustrated in Figure 6.

Figure 8 is a fragmental side elevational view of the drive axle housing.

Figure 9 is a transverse sectional view of the axle housing shown in Figure 8 with a spring supporting saddle connected therewith.

Figure 10 is a side elevational view of the saddle and associated U-bolts shown in Figure 9 with a portion of a supported spring shown in transverse section.

Figure 11 is a fragmental side elevational view showing an adjustable equalizing lever constituting one of the elements of my invention.

Figure 12 is a transverse sectional view of a vehicle frame showing the oppositely positioned equalizing levers associated therewith in accordance with the showing in Figure 11.

Figure 13 is a fragmental side elevational view showing a modified adjustable equalizing lever.

Figure 14 is a view taken on the plane indicated by line 14—14 in Figure 15.

Figure 15 is a transverse section on line 15—15 of Figure 13 and,

Figure 16 is a side elevational view of a still further modified form of the invention.

Similar reference characters indicate like parts throughout the several views.

The improved vehicle of this invention may comprise a single unitary frame of usual construction to which is connected the various supporting and propelling means hereinafter described but as illustrated in Figure 1 the vehicle is preferably constructed from an ordinary vehicle having only a single rear axle by the addition thereto of an extension to the frame and by the further addition of a second axle thus providing a vehicle construction comprising a pair of rear axles. As shown in Figure 1, 8 indicates a portion of the frame of a standard vehicle having a single drive axle. Said frame includes the usual transverse member rigidly secured to side members 8. The frame just described is extended rearwardly by attaching to each longitudinal member 8 a member 11 which is rigidly secured thereto as by means of spring supporting brackets hereinafter referred to. Members 11 are rigidly connected together by transverse members similar to members 9, the parts so far described being all rigidly secured together to form an elongated frame for the vehicle.

Arranged adjacent the rear end of the frame just described are dead and drive axles 12 and 13 respectively which support at opposite ends thereof wheels 14 and 15 respectively. Axle 13 (Figures 1 and 2) is provided with a housing 16 for the usual differential and for a gear such as a worm to drive said differential. Rigidly secured to housing 16 is the rear end of a forwardly projecting torque tube 17 the forward end of which is journalled and slidable in a torque pilot 18 which comprises a body portion 19 provided with a tubular portion 21 for receiving the intermediate portion of tubular dead axle 12 to which tubular portion 21 is secured by means of a pin 22. Pilot 18 comprises a cap portion 23 detachably secured to body portion 19 in surrounding relation to tube 17 by means of bolts 24, suitable shims being provided to avoid an immovable fit between pilot 18 and tube 17. Operatively connected with the transmission 25 is one end of a propeller shaft 26 which may be of standard construction and which extends rearwardly through tube 17 and to the rear end of which the worm within housing 16 is secured. Shaft 26 is provided with a telescopic or splined connection 27 and a universal joint 28 on each side of said splined connection, one of the joints being preferably disposed adjacent the front end of tube 17.

In order to yieldingly resist the movements of axles 12 and 13 just described and in order that the shocks applied to one axle may be transmitted in part to the other axle the axles are yieldingly connected to the frame in the manner about to be described. Journaled on each end of each axle 12 and 13 between the frame and wheels 14 and 15 is a spring supporting saddle 29 to which is rigidly secured the intermediate portion of a leaf spring assembly 31 by means of U-bolts 32 and nuts 33, the springs preferably being secured to the axles at points slightly spaced from the centers thereof as indicated in Figure 1, such that the forward extensions thereof are slightly longer than the rear extensions thereof. The forward extensions of springs 31 are pivotally secured at 34 to brackets 35 which further function to secure lapped members 9 and 11 of the frame in rigid position. The rearward extensions of springs 31 are pivotally secured at 36 to the inner ends of shackles 37 whose outer ends are pivotally secured at 38 to the opposite ends of an equalizing lever 39 pivotally secured centrally thereof at each side of the frame to a bracket 41 as indicated at 42. Instead of securing pilot 18 to axle 12 it may be journaled and one of the spring supporting saddles fixed to the axle.

In operation of the construction described, power is transmitted from transmission 25 through propeller shaft 26 to the differential within housing 16 for driving the wheels carried by axle 13. The torque reactions imposed on the housing 16 are resisted by torque tube 17, and the pin connection 22 between pilot 18 and dead axle 12 torques dead axle 12 upon application of brakes to wheels 14 carried by axle 12 and, due to splined connection 27 and universal joints 28, axles 12 and 13 are free to oscillate vertically or to tilt in vertical planes as the wheels carried thereby pass over irregularities in the road. When irregularities are encountered by the wheels the upward movement of each axle is resisted by springs 31, the journaled connections of saddles 29 with axles 12 and 13 and the splined connection 27 together with the slidable connection between pilot 18 and tube 17 permitting the springs to move about their pivotal connections 34 when the springs deflect so that destructive shocks are not transmitted to the torque resisting connections and the propeller shaft. It will further be observed that when either axle moves vertically the springs supported thereby will be correspondingly moved which through corresponding shackles 37 will cause levers 39 to rock on their pivots 42 transmitting the shock in a downward direction to the springs carried by the other axle in a manner that will be readily understood. It will thus be seen that each axle is free to move substantially in a vertical plane without causing a corresponding movement of the frame of the vehicle, and that the shocks to the springs individual to one axle are in part transmitted in a reverse direction to the springs individual to the other axle. Further, in view of the fact that splined connection 27 and universal joints 28 are provided, the freedom of the axles is permitted without setting up destructive stresses in the propeller shaft or in the torque connection.

In the form of the invention shown in Figure 3 housing 16 is connected with transmission 25 by a torque tube 43 provided with a telescopic or splined joint 44 and universal joints 45 and 46 for permitting free vertical oscillation of axles 12 and 13. In this form of the invention pilot 18 is slidably mounted on tube 43 forwardly of universal joint 46 permitting vertical reciprocation of axle 13 independent of axle 12 and the slidable connection of pilot 18 with tube 43 and the telescopic joint 44 provides for the free flexing of springs 31 in the manner above set forth. In this form of the invention a propeller shaft is mounted within tube 43 provided with universal joints coincident with joints 45 and 46 and is also splined adjacent spline 44 adapting it to flexing and elongation simultaneously with tube 43. Pilot 18 in this form of the invention is journalled on axle 12 and one of the spring supporting saddles 29 is fixed to axle 12 for resisting the torque reactions upon application of the brakes to wheels 14 carried by axle 12.

In Figures 4 and 5 is illustrated a modification of the invention in which a standard torque tube construction 47 is provided, the rear end of which is rigidly secured to drive axle housing 16 and the forward end of which is connected by means of a universal joint 48 to a transverse member 49 of frame 49', which frame as shown is a standard frame, but may be of the attachment type shown in Figure 1. Torque tube 47 is provided with an intermediate member 50 including a universal joint 51. Member 50 is provided with a bracket 52 carrying a dead axle engaging tubular member 53 which is secured to axle 12 by means of pin 54. The differential driving worm in housing 16 is driven by a drive shaft extending through tube 47 and member 50 and provided with universal joints whose centers coincide with those of joints 48 and 51. Torque tube 47 in this form of the invention holds axles 12 and 13 in proper position endwise of the frame and in order to firmly hold the ends of the axles in proper position endwise of the frame axle 12 is provided with radius rods 55 and 56 each secured at one end to axle 12 adjacent an end of the axle and the other end of each of the radius rods is rigidly secured in any suitable manner to the torque tube 47 adjacent universal joint 48. Likewise the ends of axle 13 are supported from movement endwise of the frame by radius rods 57 and 58 each rigidly secured at one end to tube 47 adjacent universal joint 51 and at its other end to axle 13 adjacent an end thereof.

In order to yieldingly resist the movements of axles 12 and 13 just described and in order that the shocks applied to one axle may be transmitted in part to the other axle the axles are yieldingly connected to the frame by springs 59 which are secured to saddles 61 by U-bolts 62 and nuts 63 with saddles 61 journaled on the ends of axles 12 and 13. Due to the connections of axles 12 and 13 restricting movement thereof longitudinally of the frame the forward ends of springs 59 are shackled to the frame by shackles 64 and the rear ends of the springs at each side of the vehicle are connected to the opposite ends of an equalizing lever 65 by shackles 66, the levers 65 being centrally pivoted to the frame at 67 for oscillation thereof upon vertical movement of either axle for transferring the shocks to the springs carried thereby to the springs carried by the other axle in the manner above set forth.

In Figure 6 is illustrated a still further modification of the invention in which drive axle 13 is positioned forwardly of dead axle 12 and in which drive axle 13 is as indicated in Figures 1 and 2 provided with a torque tube 68 rigidly secured at one end thereof to housing 16 of axle 13 and secured at the opposite end thereof to frame 49' by means of a universal joint 69. Axle 13 is yieldably connected to the frame by springs 71 secured intermediate their ends to saddles 72 journaled on axle 13 by means of U-bolts 73 and nuts 74. The forward extensions of springs 71 are flexibly connected to the frame by shackles 75 and the rearward extensions of springs 71 are connected to the forward ends of centrally pivoted equalizing levers 76 by shackles 77. The opposite or rear ends of levers 76 are flexibly connected by means of shackles 78 to the rearward extensions of springs 79 whose forward extensions are pivotally connected at 81 to brackets 82 secured to the vehicle frame. The intermediate portions of springs 79 are connected by means of U-bolts 83 and nuts 84 to saddles 85 one of which is journaled on axle 12 adjacent one end thereof and the other of which is secured by pins 86 (Figure 7) extending through dead axle tube 87, wheel spindle 88 and saddle or journal 85 for resisting the torque reactions upon application of brakes to wheels 14 carried by dead axle 12.

In accordance with this form of the invention both axles are yieldably connected to the frame by compensating spring suspensions for free and independent oscillation and in which a shorter propeller shaft of comparatively simpler construction is required.

As the spring supporting saddles are all journaled on the drive axles 13 preferably the housings of such axles as indicated at 13' in Figure 8 are provided at each end thereof with integral spaced flanges 89 defining journal seats 91 for receiving the spring seats or saddles which as indicated in Figures 9 and 10 are preferably, in order to facilitate assembly, of sectional formation comprising a lower section 92 and an upper section 93, the sections being confined within seats 91 by springs 94 and U-bolts 95 corresponding to the springs and U-bolts herein before described. Section 92 is preferably provided with U-bolt receiving grooves 96 and section 93 is provided with U-bolt spacing flanges 97.

In the forms of the invention above described compensating spring suspensions are utilized comprising levers pivotally connected intermediate their ends to the vehicle frame and to the opposite ends of which corresponding ends of axle supported springs are flexibly connected for transferring the unabsorbed shocks to the springs of either axle upon oscillation thereof to the springs of the other axle as well as equalizing the load carried by the vehicle on the separate axles through the springs carried thereby.

In vehicle constructions of the character disclosed embodying a driving axle and a dead axle it is frequently desirable that a greater portion of the load be borne by the driving axle for the sake of greater traction efficiency.

Accordingly, the invention comprises constructions for effecting such results.

Referring to Figures 11 and 12 frame 11 at opposite sides thereof in transverse alinement is provided with apertures 98 in which are positioned flanged bearing members 99 in which are journalled the opposite ends of a shaft 101. Shaft 101 is provided with reduced terminally threaded extensions 102 outwardly of members 98 defining with shaft 101 shoulders 103 flush with the outer surfaces of the flanges of members 99. Suitably fixed to each of the extensions 102 is a pinion 104 for rotation with shaft 101 which is occasioned by means of a worm gear 105 fixed to shaft 101 and operatively connected with a worm 106 in turn actuated by a shaft 107 accessible adjacent the operator's position and driven by any suitable means. Mounted at each side of frame 11 is an equalizing lever 108 provided with a longitudinally extending slot 109 provided at the base thereof with a rack 111 for meshing engagement with the respective pinion 104. A washer 112 is positioned at the outer side of each lever 108 on extension 102 and a nut 113 threadedly engaged with extension 102 holds washer 112 in engagement with lever 108 which in turn is held in engagement with member 99 with sufficient looseness to permit oscillation thereof, washer 112 also serving to hold pinion 104 in position.

As shown in Figure 11 the construction described is supported by an extension type frame of the character disclosed in Figure 1 but obviously is applicable to standard frame constructions such as shown in Figures 5 and 6. Each of the levers 108 is disposed relative to axles 12 and 13 as disclosed in Figure 6 in which dead axle 12 is arranged rearwardly of drive axle 13. It will be obvious however, that levers 108 may be disposed as indicated in Figures 1 and 5 in which drive axle 13 is positioned rearwardly of dead axle 12.

As indicated in Figure 11 the vehicle load is supported by levers 108 through pinions 104 engaging racks 111 carried by the levers and levers 108 upon oscillation of axles 12 and 13 pivot on pinions 104 for transmitting shocks to the springs of one axle to the springs of the other axle and when pinions 104 are disposed intermediate the ends of levers 108 the weight of the load will be equally distributed on axles 12 and 13. When it is desired that the greater portion of the load be carried by one axle which is usually the driving axle in order to increase traction of the wheels carried thereby shaft 107 is rotated and consequently pinions 104 which in turn through driving engagement with racks 111 move levers 108 longitudinally relative to frame 11 thus shifting the pivotal point of levers 108 and consequently varying the load supported by the two axles proportionately to the shifting of the pivotal points. Thus when it is desired that a greater portion of the load be carried by the driving axle pinions 104 are moved forwardly toward driving axle 13 to a distance proportionate to the increased load desired to have carried by the driving axle.

In Figures 13, 14 and 15 is illustrated a further form of the invention whereby the pivotal connection of the equalizing lever is movable relative to the lever and vehicle frame for shifting the load from one axle to the other axle and in which the frame at opposite sides thereof is provided with transversely alined elongated slots 115 in which are positioned elongated shaft supporting and guiding members 116 of plates 117 secured to the frame by bolts 118. Extending transversely of the frame with the ends thereof extending through and beyond members 116 is a shaft 119 on the outer ends of which trunnion blocks 121 are rotatably disposed and which blocks are slidably disposed in elongated slots 122 of levers 123 providing fulcrum or pivotal points of the levers.

Shaft 119 is retained against movement longitudinally of the frame by plates 124 removably secured to plates 117 by the upper securing bolts 118 provided in the lower edges thereof with arcuate recesses 125 for selective engagement with shaft 119. Blocks 121 are moved longitudinally in slots 122 and locked in position therein by elongated screws 126 having the opposite ends thereof swivelly connected to lugs 127 projecting outwardly from levers 123 adjacent the opposite ends of slots 122 and the threaded body portions thereof extending through correspondingly threaded apertures in lugs 128 extending outwardly from blocks 121. Screws 126 are provided with suitable tool engaging portions 126'. Washers 129 and nuts 131 are engaged with the opposite ends of shaft 119 for holding levers 123 and associated blocks 121 on shaft 119.

In accordance with this form of the invention, when it is desired to shift the pivot or fulcrum points of levers 123 for shifting a portion of the load carried by one axle to the other axle, plates 124 are removed and shaft 119 is shifted in guiding members 116 by any suitable means such as a pinch bar simultaneous with which screws 126 are turned through operating portions 126' for permitting as well as aiding the movement of blocks 121 carried by shaft 119 in slots 122. When shaft 119 has been moved a sufficient distance for effecting the desired relative distribution of load on the axles, plates 124 are remounted with a recess 125 of each engaged with the shaft for preventing movement thereof longitudinally of the frame and levers 123.

Thus in accordance with this form of the invention the load is supported by the axles through levers 123 and the load carried by the separate axles is capable of being varied by shifting the fulcrum or pivotal points of levers 123 without shifting the levers.

In Figure 16 is illustrated a still further modification of the invention embodying means for raising the dead axle and consequently the wheels carried thereby for transferring the load carried by the vehicle to the driving axle in order to increase the tractive efficiency of the wheels carried thereby and wherein driving axle 13 is disposed adjacent one end of frame 49' to the housing 16 of which one end of a torque tube 132 is rigidly secured the opposite end of which is connected to the frame through a universal joint 133, axle 13 being driven by a propeller shaft extending through tube 132. Disposed adjacent axle 13 and forwardly thereof is a dead axle 12 to which spring supporting saddle 29 is journaled adjacent one end thereof and a saddle is fixed thereto adjacent the other end thereof for torquing axle 12. Supported on saddles 29 are the intermediate portions of the springs 31 secured to the saddles by U-bolts 32 and nuts 33. The forward extensions of springs 31 are pivotally connected at 34 to frame supported brackets 35. The rearward extensions of springs 31 are flexibly connected by shackles 37 to the forward ends of equalizing levers 39 whose rearward ends are flexibly connected by shackles 37 to the rearward extensions of springs 31 journaled on axle 13 in the manner shown in Figure 1 with the forward extensions thereof flexibly connected to the frame by shackles 134.

Axle 12 is provided intermediate the ends thereof with an eye member 135 for engagement by hook member 136 carried by a cable 137 which extends over and is guided by a sheave 138 carried by a shaft 139 substantially vertically of axle 12 and from which cable 137 extends forwardly of the frame substantially parallel with the horizontal plane thereof to a drum 141 to which the opposite end of the cable is secured and about which a substantial length thereof is wound. Drum 141 is disposed adjacent the driver's seat and has fixed thereto a ratchet wheel 142 which is engaged by a suitably spring pressed pawl 143 pivoted to frame 49' for preventing reverse rotation of ratchet wheel 142. A lever 144 has the inner end thereof journaled on shaft 145 to which drum 141 is secured and lever 144 is provided with a yieldably downwardly urged rod 146 which at its inner end carries a pawl 147 whereby upon oscillation of lever 144 pawl 147 upon rearward movement lever 144 will ride over the teeth of ratchet 142 in yielding frictional engagement therewith and which upon forward movement of lever 144 will engage the teeth of ratchet 142 thereby rotating same as well as drum 141 and consequently winding cable 137 thereon resulting in raising axle 12 and consequently wheels 14 carried thereby for transferring the load to wheels 15 carried by driving axle 13 proportionate to the extent to which wheels 14 are raised from bearing engagement with the roadway, the load being carried entirely by axle 13 upon total disengagement of wheels 14 with the roadway.

From the foregoing disclosure it will be seen that novel road vehicle constructions are provided embodying a driving axle and a dead axle which are associated with the driving mechanism and vehicle frame in such manner that the wheels carried by the axles readily respond to road irregularities without undue strain to the torquing and driving connections.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as new and desire to secure by United States Letters Patent is:—

1. A multi-wheel road vehicle comprising a frame; a drive axle and a dead axle disposed adjacent one end of said frame, in tandem, with the drive axle behind the dead axle; a drive shaft extending past said dead axle and operatively connected with said dead axle; torque-resisting means associated with said drive axle and through which said drive shaft extends; and a compensating spring suspension interconnecting said axles and said frame, permitting limited endwise movement of said axles with relation to said frame, comprising springs to the mid-portions of which said axles are connected.

2. A multi-wheel road vehicle, comprising a frame; a drive axle and a dead axle disposed adjacent one end of said frame; torque-resisting means for said drive axle; a drive shaft for said drive axle extending through said torque-resisting means; springs secured at the mid-portions thereof to the opposite ends of said axles; corresponding ends of said springs being flexibly connected to the frame; load-equalizing means carried by said frame and flexibly connected to the opposite ends of said springs; and a slidable connection between said axle and said torque-resisting means, whereby the latter serves to transmit driving torque reactions from the driving axle to the dead axle.

3. A multi-wheel road vehicle comprising a frame; a drive axle and a dead axle disposed adjacent one end of said frame; a drive shaft operatively connected with said drive axle; a compensating spring suspension interconnecting said axles and said frame permitting limited endwise movement of said axles with relation to said frame comprising adjustable means to variably distribute the load on said axles.

4. The combination defined in claim 3 in which said compensating spring suspension comprises springs secured at the mid-portions thereof to said axles and having corresponding ends thereof flexibly secured to said frame, and levers rockably mounted on adjustable pivots flexibly connected at the opposite ends thereof to the other ends of said springs.

5. A multi-wheel road vehicle comprising a frame; a drive axle and a dead axle disposed adjacent one end of said frame; a torque tube rigidly connected at one end thereof to said drive axle and slidably connected with said dead axle; a drive shaft for said drive axle extending through said torque tube; and a spring suspension interconnecting said axles and said frame permitting limited endwise movement of said axles with relation to said frame.

6. The combination defined in claim 5 in which said slidable connection comprises a tubular dead axle engaging member, and a tubular member at right angles to said dead axle engaging member slidably engaged with said torque tube.

7. A multi-wheel road vehicle comprising a frame; a drive axle and a dead axle disposed adjacent one end of said frame and yieldably connected thereto; a flexible drive shaft extending from the transmission of said vehicle to said drive axle and operatively connected thereto; a torque tube attached to said drive axle; said torque tube surrounding said drive shaft and slidably connected to said dead axle; and a spring suspension interconnecting said axles and said frame.

8. The combination defined in claim 7 in which said slidable connection comprises a torque pilot including a tubular dead axle engaging member and a tubular torque tube engaging member at right angles to said first member.

9. A multi-wheel road vehicle comprising a frame; a drive axle and a dead axle disposed adjacent one end of said frame; a flexible and extensible torque tube connected to the transmission of said vehicle and said drive axle; a flexible and extensible drive shaft extending through said torque tube and operatively connected with said drive axle; a torque pilot supported by said dead axle and slidably connected with said torque tube; springs supported at the mid portions thereof by the opposite ends of said axles; corresponding ends of said springs secured to said frame; and equalizing levers flexibly connected at the opposite ends thereof to the other ends of said springs.

10. The combination defined in claim 9 in which said equalizing levers are pivoted intermediate their ends on adjustable pivot members.

11. A multi-wheel road vehicle comprising a frame; a drive axle disposed adjacent one end of said frame; a torque tube rigidly connected at one end thereof to said drive axle and flexibly connected at the other end thereof to said frame by a universal joint; a dead axle intermediate said drive axle and said universal joint; said dead axle connected to an intermediate portion of said torque tube; a universal joint in said torque tube intermediate said drive axle and said dead axle; a spring suspension interconnecting said axles and said frame; and means for maintaining the opposite ends of said axles against longitudinal movement relative to said torque tube.

12. The combination defined in claim 11 in which said connection of said dead axle with said torque tube comprises a bracket carried by said torque tube rigidly secured to said dead axle for resisting the torque reactions upon application of brakes to the wheels carried by said dead axle.

13. A multi-wheel road vehicle comprising a frame; a drive axle disposed adjacent one end of said frame comprising a housing for a differential and a gear such as a worm for driving said differential; a rigid torque tube rigidly connected at one end thereof to said housing and connected at the opposite end thereof by a universal joint to said frame; a dead axle rearwardly of said drive axle; springs, the mid-portions of which are supported by the opposite ends of said axles; corresponding ends of said springs pivotally connected to said frame; and equalizing levers, the opposite ends of which have flexible connections with the opposite ends of said springs, at least one of said flexible connections comprising a shackle.

14. The combination defined in claim 13 in which said springs supported by said drive axle are journaled thereon and in which one of said springs supported by said dead axle is journaled thereon and the other of which is fixed thereto for torquing said dead axle.

15. The combination defined in claim 13 in which said equalizing levers are pivotally supported intermediate their ends on adjustable fulcrums for varying the load carried by the drive and dead axle.

16. A multi-wheel road vehicle comprising a frame; a drive axle and a dead axle disposed adjacent one end of said frame; springs supported at the mid-portions thereof by the opposite ends of said axles; corresponding ends of said springs pivoted to said frame; said frame provided with transversely alined longitudinal slots at opposite sides thereof; a longitudinally adjustable shaft extending transversely through said slots with the opposite ends projecting beyond the opposite sides of said frame; means for holding said shaft in any adjusted position in said slots; a trunnion block supported by each end of said shaft; an equalizing lever at each side of said frame provided with an elongated slot for the reception of the respective trunnion block; means co-operating with said levers and said blocks for adjusting and holding said blocks in said slots; and flexible connections between the opposite ends of said levers and the opposite ends of said springs.

17. In a multi-wheel vehicle, a frame; a drive axle and an idle axle disposed in tandem adjacent one end of said frame; mechanism connected to said drive axle for driving the latter; a suspension system for mounting the frame upon the axles while permitting separational movement between the latter; and a torque-neutralizing device non-rotatably secured to said drive axle and slidably connected directly to said idle axle to transmit the driving torque reactions from the former to the latter.

18. In a multi-wheel vehicle, a frame; tandem axles comprising a drive axle arranged behind an idle axle in tandem adjacent one end of said frame; a drive shaft extending into said drive axle; a suspension system for mounting the frame on the axles; and a torque-resisting device comprising a tube housing said shaft; said tube being rigidly connected to said drive axle and extending forwardly into direct connection with said idle axle to transmit torque reactions thereto.

19. In a multi-wheel vehicle, a frame; a pair of tandem axles disposed beneath one end of said frame; an equalizing suspension at each side of said frame for mounting the latter on said axles, each suspension being longitudinally arranged and having a transverse pivotal axis on the frame; and adjustable means for shifting said axle and a portion of said frame relative to each other longitudinally of the frame, to vary the proportions of the load supported by the respective axles of the pair.

In testimony whereof I affix my signature.

ARTHUR I. MARCUM.